(12) United States Patent
Kim et al.

(10) Patent No.: US 9,287,905 B2
(45) Date of Patent: Mar. 15, 2016

(54) METHOD AND APPARATUS FOR TRANSMITTING CSI-RS AND DATA USING PARTIAL MUTING OF CSI-RS

(71) Applicant: Samsung Electronics Co., Ltd., Suwon-si, Gyeonggi-do (KR)

(72) Inventors: Sung Tae Kim, Suwon-si (KR); Youn Sun Kim, Seongnam-si (KR); Jin-Kyu Han, Seoul (KR); Myung Hoon Yeon, Yongin-si (KR); Cheng Shan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/196,606

(22) Filed: Mar. 4, 2014

(65) Prior Publication Data

US 2014/0185527 A1 Jul. 3, 2014

Related U.S. Application Data

(63) Continuation of application No. 13/156,685, filed on Jun. 9, 2011, now Pat. No. 8,665,972.

(30) Foreign Application Priority Data

Jun. 11, 2010 (KR) ........................ 10-2010-0055607

(51) Int. Cl.
*H04B 1/04* (2006.01)
*H04L 5/00* (2006.01)

(52) U.S. Cl.
CPC ............ *H04B 1/0475* (2013.01); *H04L 5/0044* (2013.01); *H04L 5/0053* (2013.01); *H04L 5/0057* (2013.01); *H04L 5/0048* (2013.01)

(58) Field of Classification Search
CPC ... H04L 5/0044; H04L 5/0023; H04L 5/0048; H04L 5/0053; H04L 1/0606; H04L 5/0057; H04L 5/0058; H04L 5/0091; H04L 5/0035; H04L 5/005; H04L 5/0051; H04L 5/0062; H04L 5/0064; H04L 5/0073; H04B 1/0475; H04B 17/005; H04B 17/0067; H04B 7/024; H04B 7/0626; H04B 7/0639
See application file for complete search history.

(56) References Cited

U.S. PATENT DOCUMENTS

| | | | | |
|---|---|---|---|---|
| 8,665,972 B2 * | 3/2014 | Kim | ...................... | H04L 5/0044 375/260 |
| 8,804,586 B2 * | 8/2014 | Fong | ..................... | H04L 5/0053 370/311 |
| 8,897,182 B2 * | 11/2014 | Yoon | ................. | H04W 72/0446 370/286 |
| 2004/0203476 A1 | 10/2004 | Liu | | |
| 2007/0230324 A1 | 10/2007 | Li et al. | | |

(Continued)

FOREIGN PATENT DOCUMENTS

WO  WO2011100676  *  8/2011

*Primary Examiner* — Hirdepal Singh
(74) *Attorney, Agent, or Firm* — Jefferson IP Law, LLP

(57) ABSTRACT

A method and apparatus for transmitting Channel State Information Reference Symbol (CSI-RS) and data with partial muting of the CSI-RS are proposed. The method includes determining a CSI-RS pattern to be used among CSI-RS pattern candidates, determining a muting pattern for muting some resource elements constituting CSI-RS pattern candidates except for the determined CSI-RS pattern, mapping data symbols and CSI-RS to resource elements in a resource grid with rate patching in consideration of the CSI-RS pattern and muting pattern, and transmitting the data symbols and CSI-RS to a terminal.

12 Claims, 12 Drawing Sheets

(56) References Cited

U.S. PATENT DOCUMENTS

| | | | |
|---|---|---|---|
| 2011/0235743 A1* | 9/2011 | Lee et al. | 375/295 |
| 2011/0237270 A1 | 9/2011 | Noh et al. | |
| 2012/0076106 A1* | 3/2012 | Bhattad et al. | 370/330 |
| 2012/0106374 A1 | 5/2012 | Gaal et al. | |
| 2012/0195286 A1 | 8/2012 | Kim et al. | |
| 2012/0220327 A1* | 8/2012 | Lee et al. | 455/509 |
| 2012/0230271 A1 | 9/2012 | Kim et al. | |
| 2012/0315859 A1 | 12/2012 | Lee et al. | |
| 2013/0044685 A1* | 2/2013 | Fong et al. | 370/328 |
| 2013/0077518 A1 | 3/2013 | Abe et al. | |
| 2013/0094384 A1 | 4/2013 | Park et al. | |
| 2013/0294277 A1* | 11/2013 | Nagata | H04L 5/0048 370/252 |

\* cited by examiner

METHOD AND APPARATUS FOR TRANSMITTING CSI-RS AND DATA USING PARTIAL MUTING OF CSI-RS

CROSS-REFERENCE TO RELATED APPLICATION(S)

This application is a continuation application of a prior application Ser. No. 13/156,685, filed on Jun. 9, 2011, which claimed the benefit under 35 U.S.C. §119(a) of a Korean patent application filed on Jun. 11, 2010 in the Korean Intellectual Property Office and assigned Serial No. 10-2010-0055607, the entire disclosure of which is hereby incorporated by reference.

BACKGROUND OF THE INVENTION

1. Field of the Invention

The present invention relates to a method and apparatus for transmitting a Channel State Information Reference Symbol (CSI-RS) and data. More particularly, the present invention relates to a method and apparatus for transmitting the CSI-RS and data with partial muting of the CSI-RS.

2. Description of the Related Art

Mobile communication systems are currently evolving from basic communication devices into high-speed, high-quality wireless packet data communication systems that provide data services and multimedia services beyond the early voice-oriented services. Recently, various mobile communication standards, such as High Speed Downlink Packet Access (HSDPA) and High Speed Uplink Packet Access (HSUPA), both defined by $3^{rd}$ Generation Partnership Project (3GPP), High Rate Packet Data (HRPD) defined by $3^{rd}$ Generation Partnership Project-2 (3GPP2), and Institute of Electrical and Electronics Engineers (IEEE) 802.16, have been developed to support the high-speed, high-quality wireless packet data services.

The $3^{rd}$ generation wireless packet data communication system of the related art, such as HSDPA, HSUPA and HRPD, uses such technologies as an Adaptive Modulation and Coding (AMC) method and a channel-sensitive scheduling method in order to improve transmission efficiency. With the use of the AMC method, a transmitter can adjust the amount of transmission data according to the channel state. For example, when the channel state is not good, the transmitter reduces the amount of transmission data to match a reception error probability to a desired level, and when the channel state is good, the transmitter increases the amount of transmission data to efficiently transmit a large volume of information while matching the reception error probability to the desired level. Using the channel-sensitive scheduling resource management method, the transmitter, since it selectively services a user having a superior channel state among several users, can increase in the system capacity, as compared with a transmitter that allocates a channel to one user and services the user with the allocated channel. Such capacity increase is commonly referred to as a multi-user diversity gain. In brief, the AMC method and the channel-sensitive scheduling method are methods for receiving partial channel state information being fed back from a receiver, and applying an appropriate modulation and coding technique at the most efficient time determined depending on the received partial channel state information.

Recently, intensive research is being conducted to replace Code Division Multiple Access (CDMA), which is the multiple access scheme used the $2^{nd}$ and $3^{rd}$ generation mobile communication systems, with Orthogonal Frequency Division Multiple Access (OFDMA) in the next generation mobile communication system. 3GPP and 3GPP2 have started standardization work on evolved systems based on OFDMA.

It is known that OFDMA, compared to CDMA, is expected to increase capacity at least in part due to performing scheduling in the frequency domain (i.e., Frequency Domain Scheduling). While capacity gain can be obtained from the time-varying channel characteristic using the channel-sensitive scheduling method, more capacity gain can be obtained using the frequency-varying channel characteristic.

In order to increase the capacity gain with the aforementioned methods, the information on the status of the radio channel should be acquired. The more accurate the channel status information, the more the capacity gain can increase. In a case of the channel status information measurement using a reference signal, the measurement accuracy is improved as the signal to interference plus noise power ratio of the received reference signal is increased. Accordingly, the interference power to the received reference signal should be reduced in order to improve to the channel status information accuracy. Among various related art methods to reduce the interference to the reference signal, the present disclosure deals with a method to reduce the interference to reference signals transmitted by different transmitters using a muting technique for keeping the time, frequency, antenna, and code resource with which the reference signal of another transmitter is transmitted empty.

FIG. 1 is a diagram illustrating a Channel State Information Reference Symbol (CSI-RS) reuse pattern and muting pattern according to the related art.

Referring to FIG. 1, part (a) shows an exemplary CSI-RS pattern of which a reuse factor is 6 for use in a Long Term Evolution Advanced (LTE-A) system.

In part (a) of FIG. 1, the Resource Elements (REs) numbered from 0 to 7 and having the same background pattern shows a CSI-RS pattern per cell, and 6 different CSI-RS patterns are shown. For one cell, one CSI-RS pattern is used such that 6 adjacent cells can use different CSI-RS patterns.

Part (b) of FIG. 1 shows an exemplary subframe in which a transmitter of one cell transmits the CSI-RS. In a case of part (b) of FIG. 1, the cell uses the CSI-RS pattern 0. Since the positions of the CSI-RS of other cells are used for data transmission, the signal of the cell can affect interference to the CSI-RSs of the 5 adjacent cells using different CSI-RS patterns. Likewise, the 5 adjacent cells affect interference to the CSI-RS of the cell using the pattern of part (b) of FIG. 1. Such interferences degrade channel estimation performance based on the CSI-RS.

Part (c) of FIG. 1 shows an exemplary subframe using the muting technique in which no data is transmitted on the resources that are used for CSI-RS transmission of other cells to mitigate channel estimation performance degradation caused by interference. Since the subframe configuration of part (c) of FIG. 1 can reduce the interference to CSI-RS as compared to the subframe configuration of part (b) of FIG. 1, it is expected to improve the channel estimation performance based on the CSI-RS. However, the subframe configuration of part (c) of FIG. 1 uses a small number of REs for data transmission as compared to the subframe configuration of part (b) of FIG. 1. Accordingly, in order to maintain the same target error rate in both the cases of parts (b) and (c), the subframe of part (c) of FIG. 1 should be configured to transmit the signal at a low Modulation and Coding Scheme (MCS) level as compared to that in the subframe of part (b) of FIG. 1. In a case of part (c) of FIG. 1, since the loss caused by the small number of REs for transmitting data is more affective that the gain obtained by the improvement of the channel estimation performance especially when a large number of transmit antennas are used, the system throughput decreases.

There is therefore a need to develop a novel muting technique different from the related art method for addressing the system throughput degradation caused by the shortage of REs for data transmission without compromising the performance improvement effect caused by the channel estimation performance enhancement with the muting technique, and method and apparatus for transmitting a control signal for supporting the novel muting technique.

SUMMARY OF THE INVENTION

Aspects of the present invention are to address at least the above-mentioned problems and/or disadvantages and to provide at least the advantages described below. Accordingly, an aspect of the present invention is to provide a method and apparatus for transmitting a Channel State Information Reference Signal (CSI-RS) and data that is capable of increasing system throughput by improving channel estimation performance, thereby addressing the system throughput degradation problem caused by using the muting technique of the related art.

In accordance with an aspect of the present invention, a method for transmitting, by a base station, CSI-RS and data is provided. The method includes determining a CSI-RS pattern to be used among CSI-RS pattern candidates, determining a muting pattern for muting some resource elements constituting CSI-RS pattern candidates except for the determined CSI-RS pattern, mapping data symbols and CSI-RS to resource elements in a resource grid with rate patching in consideration of the CSI-RS pattern and muting pattern, and transmitting the data symbols and CSI-RS to a terminal.

In accordance with another aspect of the present invention, a base station for transmitting CSI-RS and data is provided. The base station includes a controller for determining a CSI-RS pattern to be used among CSI-RS pattern candidates and a muting pattern for muting some resource elements constituting CSI-RS pattern candidates except the determined CSI-RS pattern, a resource element mapper for mapping data symbols and CSI-RS to resource elements in a resource grid with rate patching in consideration of the CSI-RS pattern and muting pattern, and an Orthogonal Frequency Division Multiplexing (OFDM) signal generator for modulating the mapped data symbols and CSI-RS, and an antenna for transmitting the modulated data symbols and CSI-RS to a terminal.

In accordance with another aspect of the present invention, a method for receiving, by a terminal, CSI-RS and data is provided. The method includes receiving a CSI-RS pattern and a muting pattern transmitted by a base station, receiving a downlink signal from the base station, estimating a channel with the CSI-RS extracted at positions constituting the CSI-RS pattern in the received downlink signal, extracting data symbols from the received downlink signal by referencing the CSI-RS pattern and the muting pattern, and decoding the extracted data symbols.

In accordance with still another aspect of the present invention, a terminal for receiving CSI-RS and data is provided. The terminal includes an antenna for receiving a downlink signal from a base station, a controller for extracting a CSI-RS pattern and a muting pattern from a signal transmitted by the base station, a channel estimator for estimating a channel with the CSI-RS extracted at positions constituting the CSI-RS pattern in the received downlink signal, a symbol extractor for extracting data symbols from the received downlink signal by referencing the CSI-RS pattern and the muting pattern, and a decoder for decoding the extracted data symbols.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to an Orthogonal Frequency Division Multiplexing (OFDM)-based radio communication system, especially abiding by the 3$^{rd}$ Generation Partnership Project (3GPP) Evolved Universal Terrestrial Radio Access (EUTRA) standard, it should be understood by those skilled in the art that the present invention can be applied to other communication systems having similar technical background and channel format, with a slight modification, without departing from the spirit and scope of the present invention.

In the following description, the term "Channel State Information Reference Symbol (CSI-RS) pattern candidate" denotes a CSI-RS reuse pattern. The base station can select some of CSI-RS pattern candidates and some of the rest as muting patterns.

1) Reference Signal Muting Based on Reuse Pattern

Figure 1:
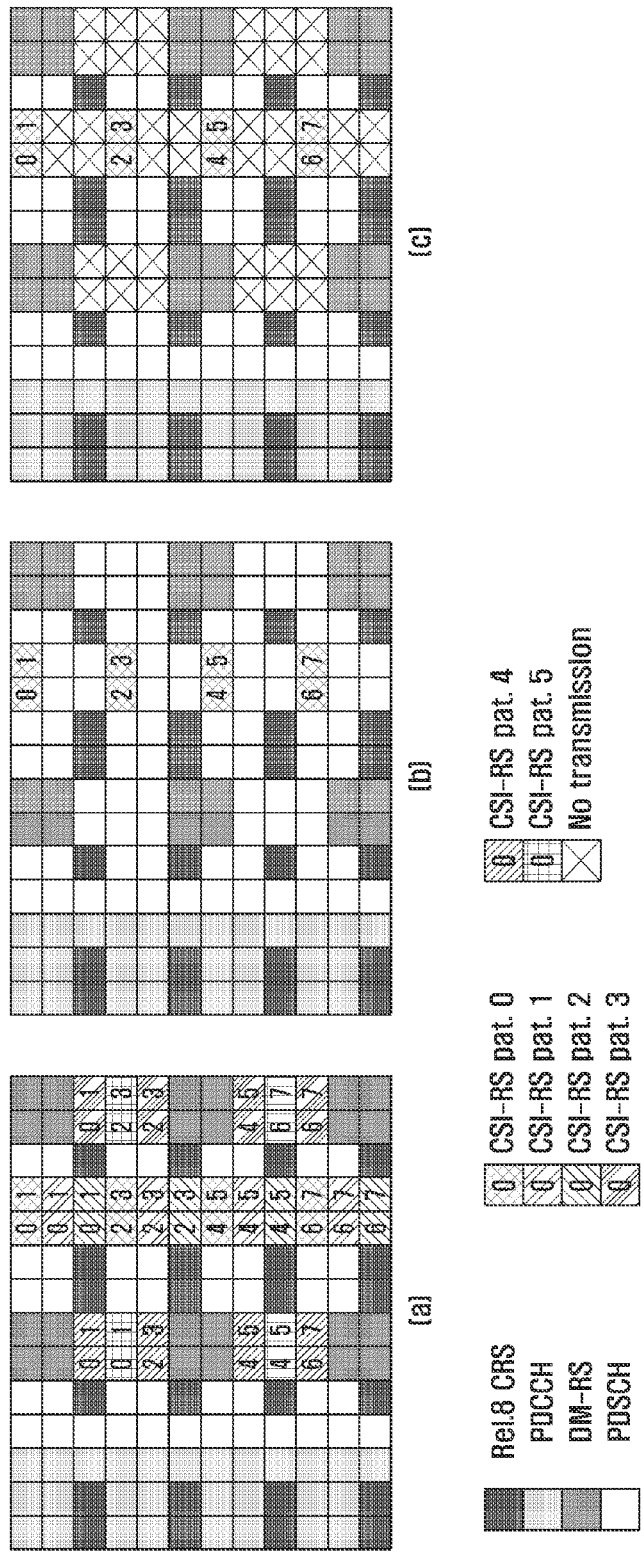
FIG. 1 is a diagram illustrating a Channel State Information Reference Symbol (CSI-RS) reuse pattern and muting pattern according to the related art.

As aforementioned, the muting method of the related art mitigates the interference to the CSI-RSs of other cells by not transmitting signals in the REs constituting the CSI-RS patterns except for the CSI-RS pattern used by the service cell as shown in part (c) of FIG. 1. However, since the muting method of the related art also has a shortcoming of system throughput reduction, techniques according to exemplary embodiments of the present invention to address the problem are described herein.

Figure 2:
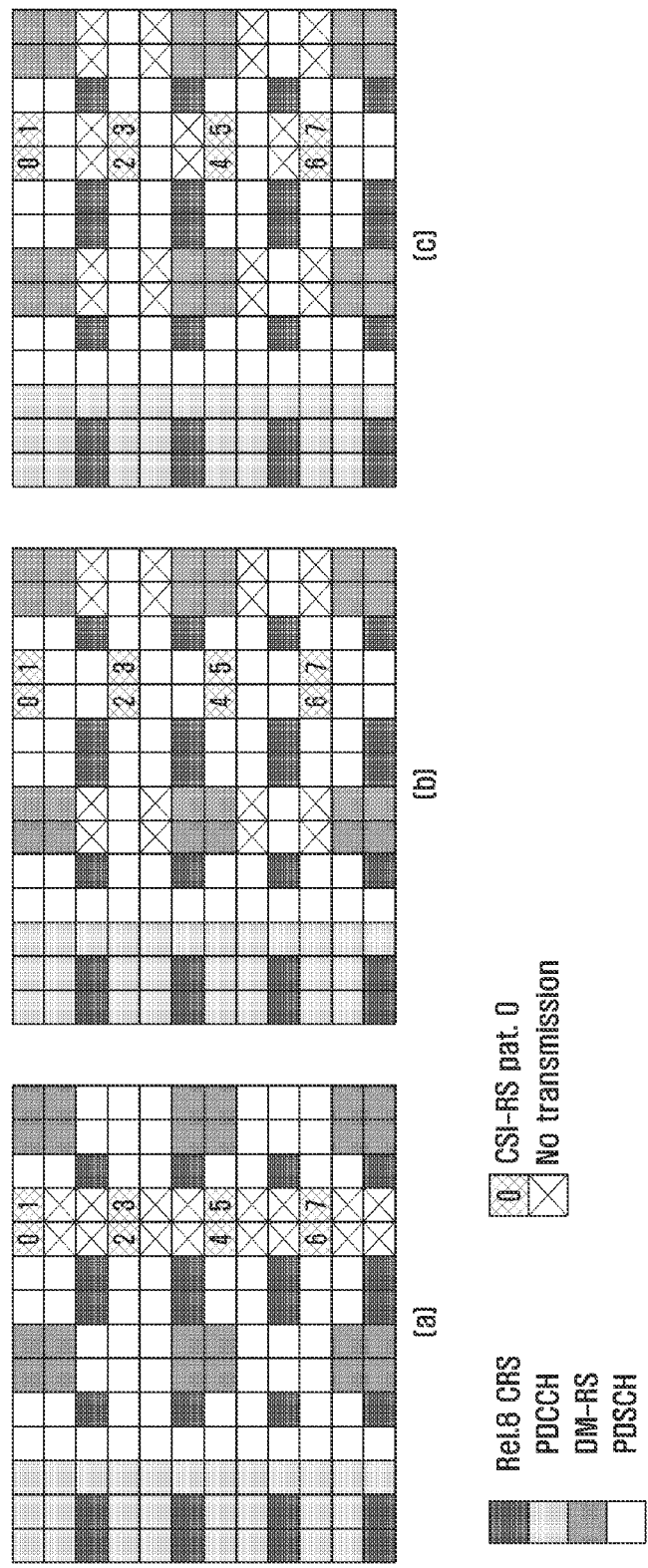
FIG. 2 is a diagram illustrating configurations of a subframe for supporting partial muting of a reference signal according to a first exemplary embodiment of the present invention.

FIG. 2 is a diagram illustrating configurations of a subframe for supporting partial muting of a reference signal according to a first exemplary embodiment of the present invention.

Referring to FIG. 2, part (a) of FIG. 2 shows an exemplary configuration in which two of 5 CSI-RS patterns, except the CSI-RS pattern of the service cell, are muted as compared to part (a) of FIG. 1. Unlike the method of the related art, this method increases the interference to the CSI-RSs of other cells due to no use of muting for all of the reuse patterns, but it is advantageous to secure more REs for data transmission. In addition to the exemplary case of part (a) of FIG. 2, the muting can be applied with various numbers of patterns and various combinations of patterns. By adjusting the number of patterns to apply muting, it is possible to use an optimal muting scheme in view of system capacity.

In the first exemplary embodiment, the muting scheme is determined according to the CSI-RS pattern. For example, part (a) of FIG. 2 is the muting scheme in which the resource elements for the CSI-RS patterns 1 and 2 in part (a) of FIG. 1 are muted. Part (b) of FIG. 2 is the muting scheme in which the resource elements for the CSI-RS patterns 3 and 4 in part (a) of FIG. 1 are muted. Also, part (c) of FIG. 2 is the muting scheme in which the resource elements for the CSI-RS patterns 3, 4, and 5 in part (a) of FIG. 1 are muted.

Figure 3:
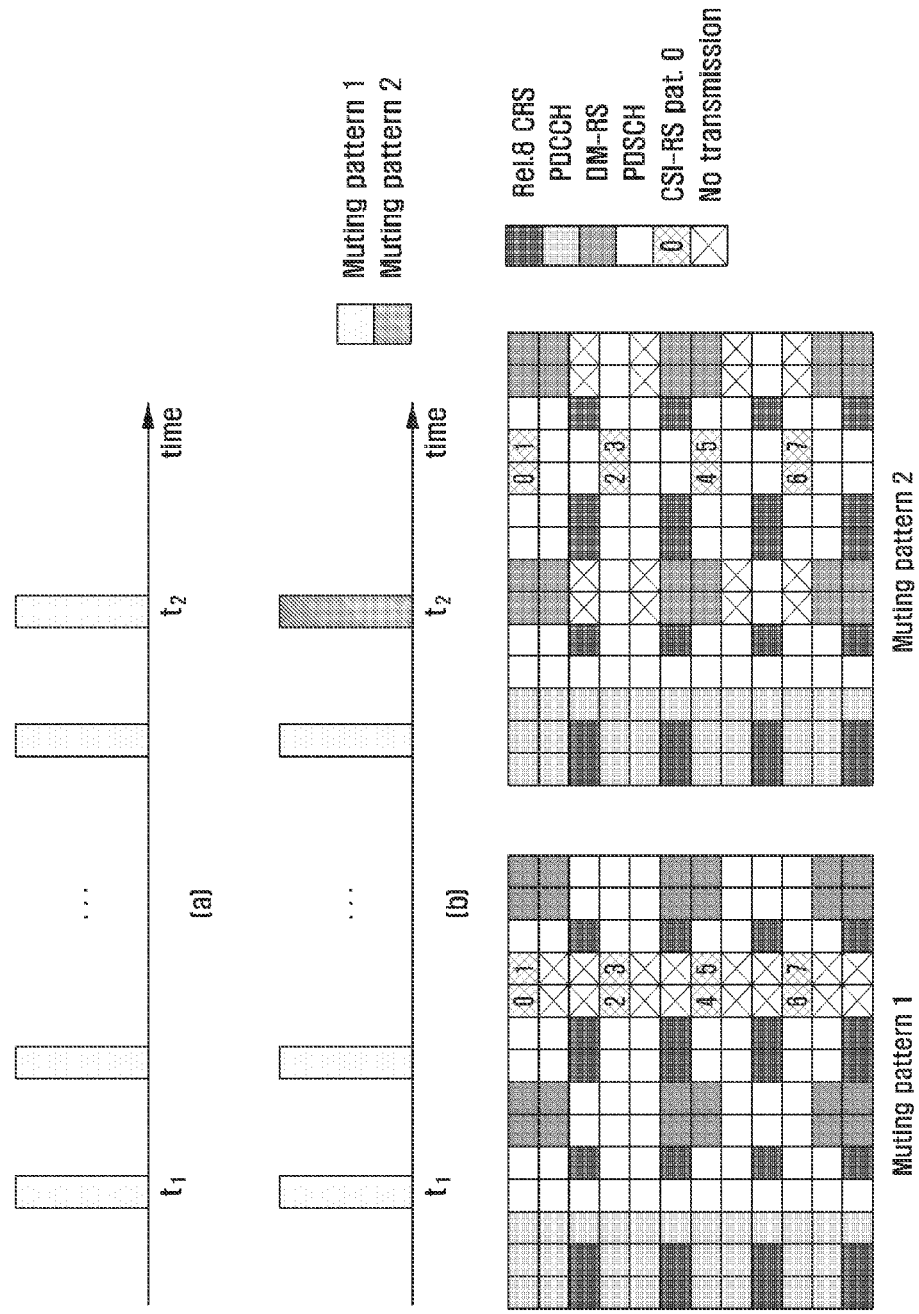
FIG. 3 is a diagram illustrating a characteristic of a partial muting method according to a second exemplary embodiment of the present invention.

FIG. 3 is a diagram illustrating a characteristic of a partial muting method according to a second exemplary embodiment of the present invention.

The aforementioned muting patterns can be designed using the following schemes.

In the first muting scheme, the muting pattern is designed as shown in part (a) of FIG. 3.

In the second muting scheme, two different muting patterns can be applied at two different times, i.e. time t1 and time t2, as shown in part (b) of FIG. 3.

In both of the two muting schemes, the muting patterns are determined through negotiation between the transmitter and receiver or notified from the transmitter to the receiver by a physical layer control signal or a higher layer signal.

In a case where a predetermined muting pattern is used and the muting pattern is determined according to the cell identifier (cell id), the CSI-RS pattern and muting pattern predefined based on the cell id of the cell to which the receiver performs handover from the current service cell is applied.

In a case where a predetermined muting pattern is used but it is necessary to change the muting pattern, the transmitter should notify the receiver of the change of the muting pattern by means of a physical layer control signal or a higher layer signal.

In a case where the muting pattern is not predetermined, the transmitter should notify the receiver of the information on the pattern by means of a physical layer control signal or a higher layer signal.

2) Reference Signal Muting Based on Antenna Port

Unlike the reference signal muting based on the reuse pattern, a scheme for muting the reference signal based on the antenna port is proposed herein.

Figure 4:
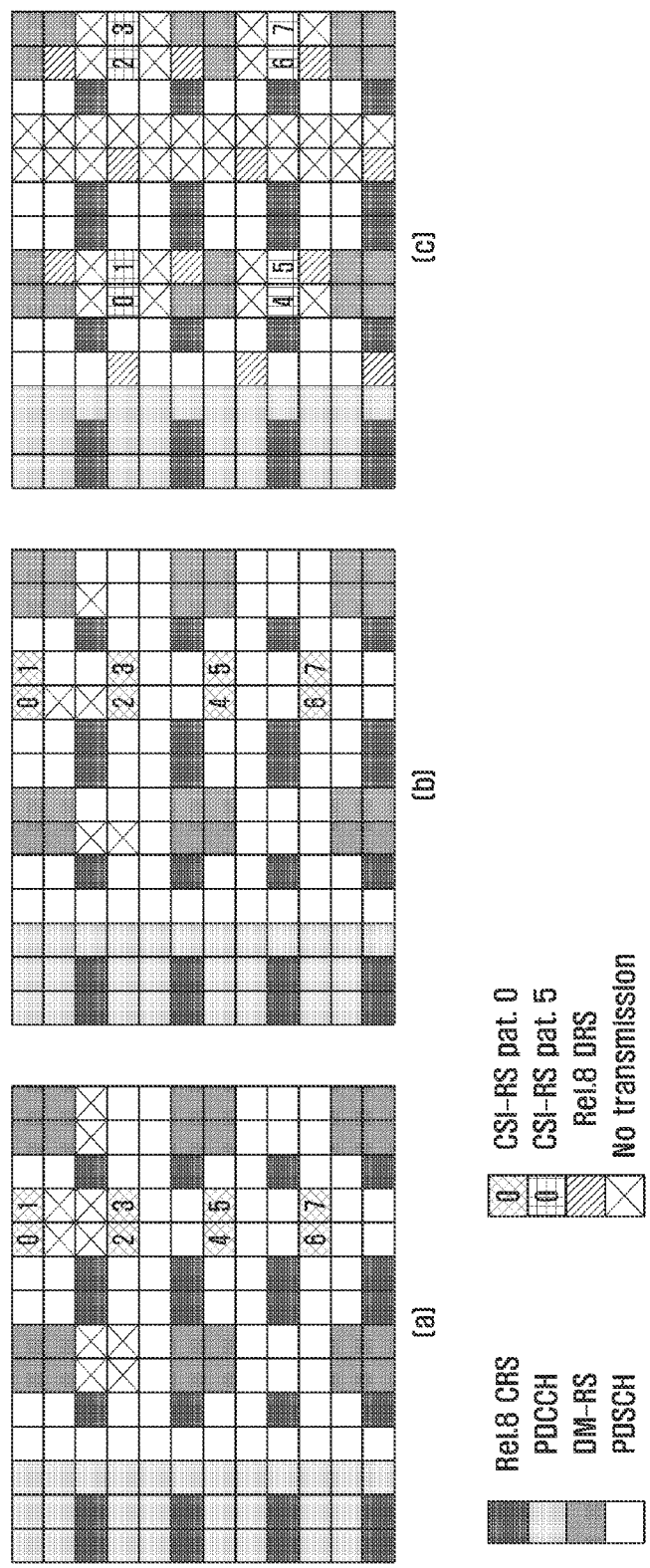
FIG. 4 is a diagram illustrating configurations of a subframe for supporting partial muting of a reference signal according to a third exemplary embodiment of the present invention.

FIG. 4 is a diagram illustrating configurations of a subframe for supporting partial muting of a reference signal according to a third exemplary embodiment of the present invention.

Referring to FIG. 4, part (a) shows an exemplary configuration in which the muting is applied to the signals for the antenna ports 0 and 1, as compared to the configuration of part (a) of FIG. 1 (using 6 reuse patterns), but not the rest of the antenna ports. The muting can be applied to the signals for a single antenna port (port 0) as shown in part (b) of FIG. 4 or less or more antenna ports as compared to the case of part (a) of FIG. 4. In a special case (i.e., a Long Term Evolution Advanced (LTE-A) system), muting the CSI-RS overlapped with a Demodulation Reference Signal (DRS) of Long Term Evolution (LTE) Release 8 (antenna port 5) in a position as shown in part (c) of FIG. 4 falls within the scope of the present invention.

Figure 5:
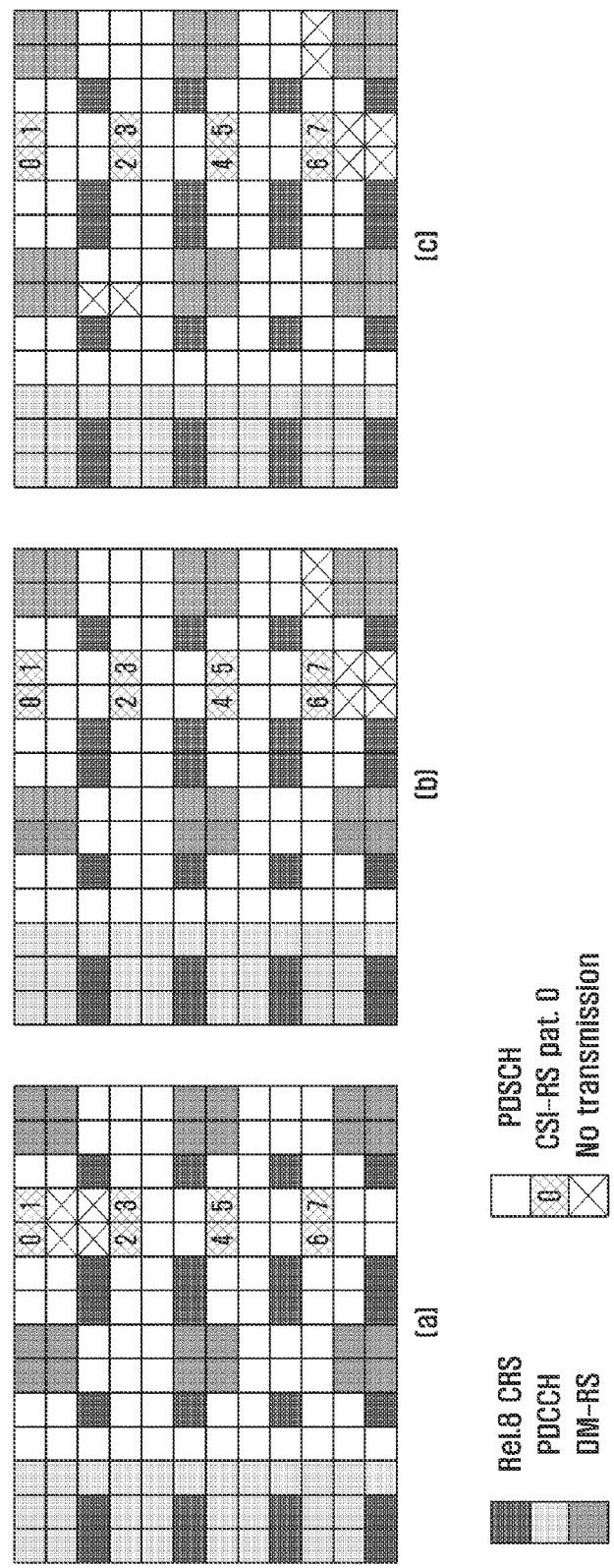
FIG. 5 is a diagram illustrating configurations of a subframe for supporting partial muting of a reference signal according to a fourth exemplary embodiment of the present invention.

FIG. 5 is a diagram illustrating configurations of a subframe for supporting partial muting of a reference signal according to a fourth exemplary embodiment of the present invention.

Referring to FIG. 5, the muting pattern is determined depending on the reuse pattern and antenna port. Part (a) of FIG. 5 shows the configuration in which the muting is applied to the reuse patterns 1 and 2 and the antenna ports 0 and 1. Part (b) of FIG. 5 shows the configuration in which the muting is applied to the reuse patterns 1, 2, and 3 and the antenna ports 6 and 7. As shown in part (c) of FIG. 5, it is possible that the muting is applied to one antenna port for some reuse patterns and multiple antenna ports for other reuse patterns.

Like the reuse pattern-based muting, in the antenna port-based muting scheme, the muting pattern is determined through negotiation between the transmitter and receiver or notified from the transmitter to the receiver by a physical layer control signal or a higher layer signal.

In a case where a predetermined muting pattern is used and the muting pattern is determined according to the cell id, the CSI-RS pattern and muting pattern predefined based on the cell id of the cell to which the receiver performs handover from the current service cell is applied.

In a case where a predetermined muting pattern is used but it is necessary to change the muting pattern, the transmitter should notify the receiver of the change of the muting pattern by means of a physical layer control signal or a higher layer signal.

In a case where the muting pattern is not predetermined, the transmitter should notify the receiver of the information on the pattern by means of a physical layer control signal or a higher layer signal.

3) Reference Signal Muting Based on Transmission Cycle

This muting scheme defines a muting cycle of a reference signal regardless of the CSI-RS transmission cycle and applies different muting patterns according to the muting cycle.

Figure 6:
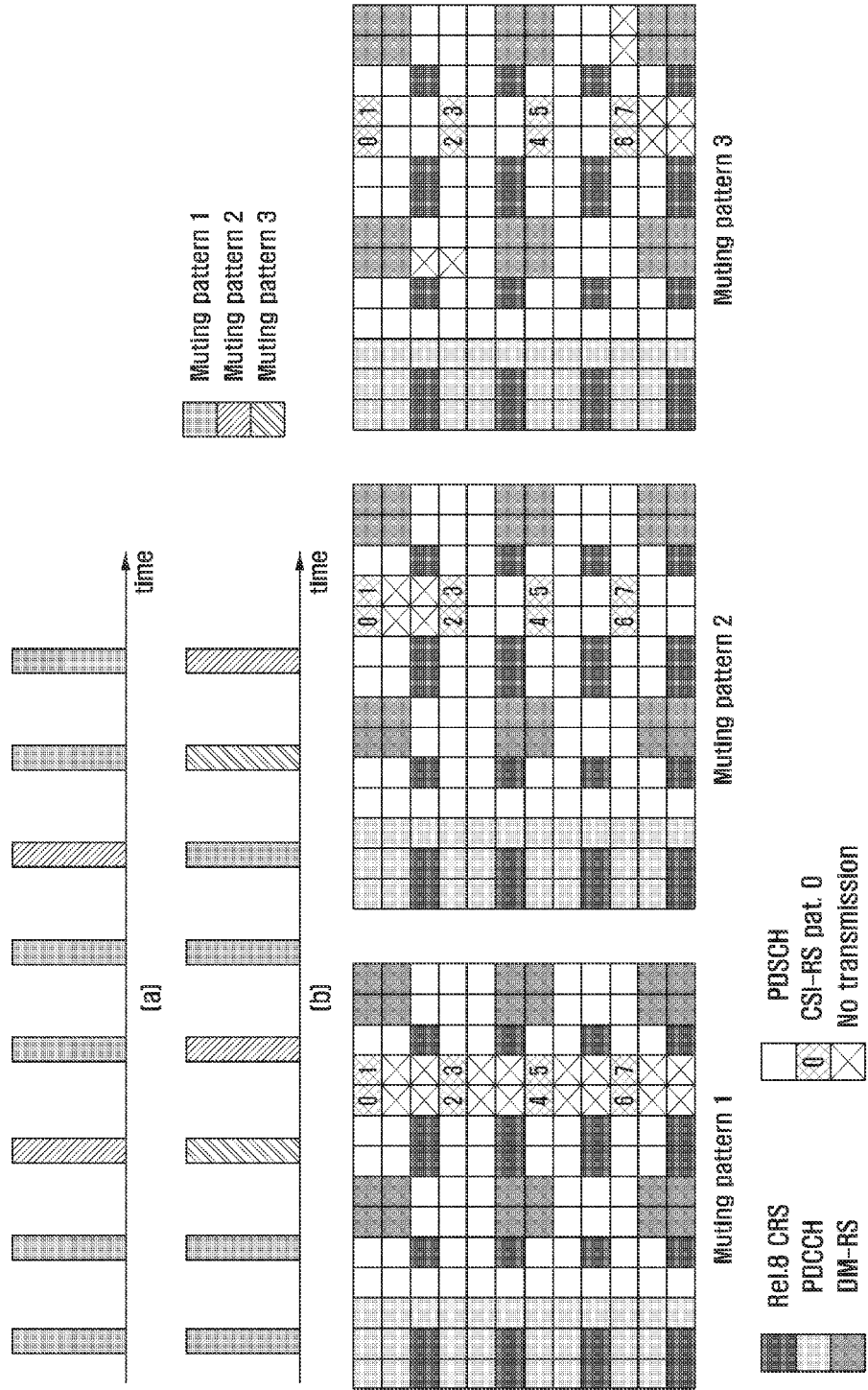
FIG. 6 is a diagram illustrating a characteristic of a partial muting method according to a fifth exemplary embodiment of the present invention.

FIG. 6 is a diagram illustrating a characteristic of a partial muting method according to a fifth exemplary embodiment of the present invention.

Referring to FIG. 6, a reference signal muting cycle is assigned in addition to the CSI-RS transmission cycle such that the muting pattern 1 and muting pattern 2 can be used alternately according to the muting signal. The muting patterns 1 and 2 can be applied to all of the muting schemes included in the exemplary embodiments of the present invention as individual muting patterns. The muting scheme can be applied to a case where no muting scheme is used as shown in part (b) of FIG. 1 and a case where all of the reuse patterns are muted as shown in part (c) of FIG. 1. Although two muting patterns are used in part (a) of FIG. 6, three or more muting patterns can be used alternately as shown in part (b) of FIG. 6. That is, different muting patterns can be applied according to the transmission time point of the subframe (downlink signal).

In a case of using different muting patterns according to the transmission time point, the transmission time points and muting patterns should be mapped. The mappings between the transmission time points and the muting patterns can rotate as the muting pattern changes periodically. In a case where the muting pattern changes dynamically according to the channel condition, it is not necessary to fix the mapping relationship between the transmission time and muting pattern such that the muting pattern changes non-periodically.

In a case of changing the muting pattern according to the transmission time point, the interferences to the CSI-RS REs of the neighbor cells are averaged such that it is possible to guarantee the average CSI-RS over a certain level in the neighbor cells.

The change of the muting pattern can be negotiated between the transmitter and receiver or notified from the transmitter to the receiver by means of a physical layer control signal or a higher layer signal.

In a case where a predetermined muting pattern is used and the muting pattern is determined according to the cell id, the CSI-RS pattern and muting pattern predefined based on the cell id of the cell to which the receiver performs handover from the current service cell are applied.

In a case where a predetermined muting pattern is used but it is necessary to change the muting pattern, the transmitter should notify the receiver of the change of the muting pattern by means of a physical layer control signal or a higher layer signal.

In a case where the muting pattern is not predetermined, the transmitter should notify the receiver of the information on the pattern by means of a physical layer control signal or a higher layer signal.

4) Reference Signal Muting Based on Resource Allocation Unit

In this exemplary embodiment, different muting patterns are used according to the frequency band, i.e., the resource allocation unit. Although the description is directed to a case using the Physical Resource Block (PRB) defined as the frequency resource allocation unit in LTE and LTE-A system in this exemplary embodiment, the resource allocation unit can be a group of resource blocks aggregated in a system bandwidth (BW) or another type of resource allocation unit in other types of systems. That is, the resource allocation unit can include any type of resource unit defined by aggregation of one or more resources on the frequency axis.

Figure 7:
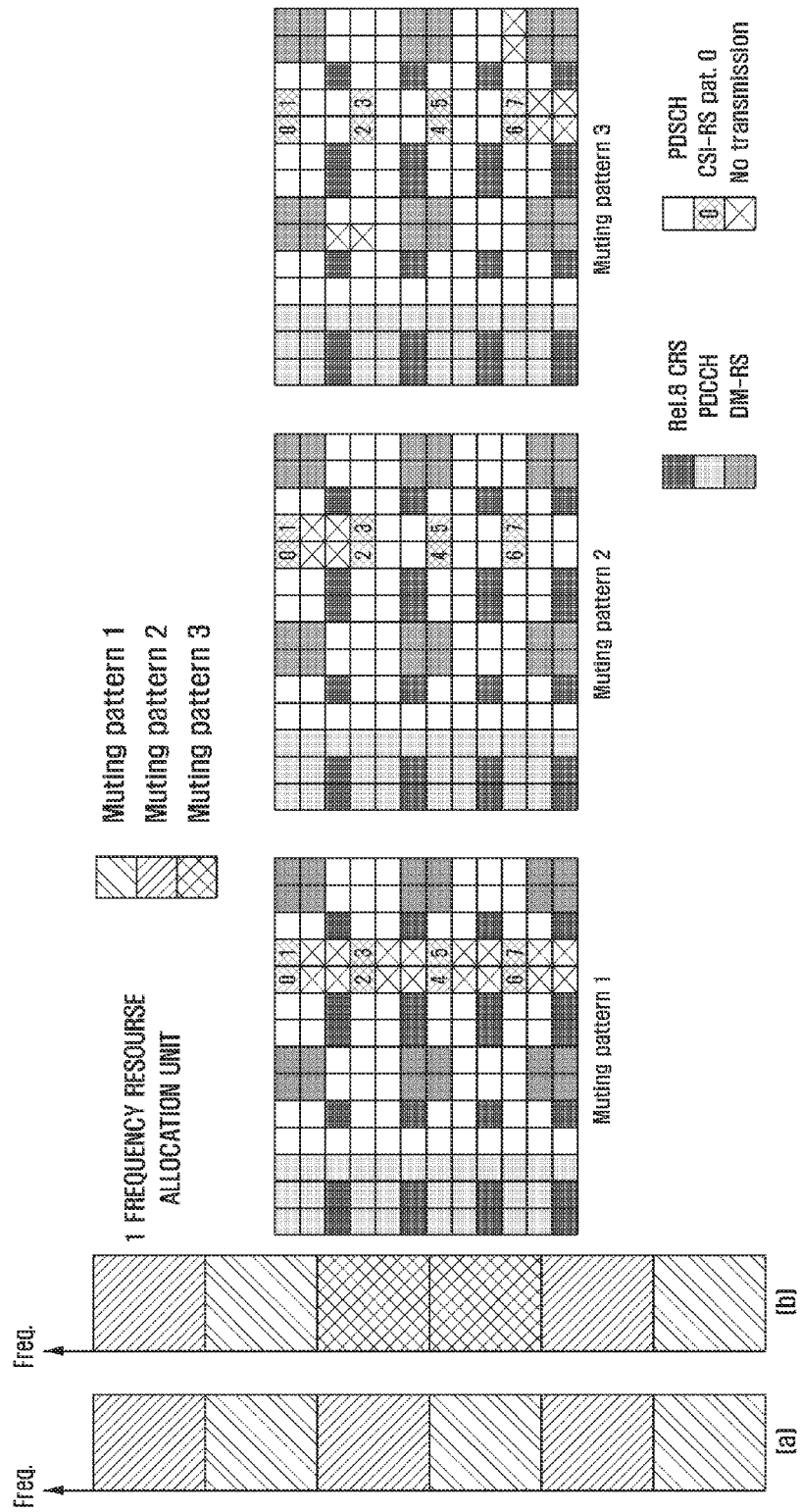
FIG. 7 is a diagram illustrating a characteristic of a partial muting method according to a sixth exemplary embodiment of the present invention.

FIG. 7 is a diagram illustrating a characteristic of a partial muting method according to a sixth exemplary embodiment of the present invention.

Referring to FIG. 7, part (a) shows an exemplary case where two different muting patterns are used alternately according to the frequency resource allocation unit. As shown in part (b) of FIG. 7, it is possible to use three or more different muting patterns alternately. The muting patterns differ from each other and can be applied to all of the muting schemes included in the exemplary embodiments of the present invention. The muting scheme can be applied to a case where no muting scheme is used as shown in part (b) of FIG. 1 and a case where all of the reuse patterns are muted as shown in part (c) of FIG. 1.

In a case of configuring the muting pattern according to the frequency band, the interferences to the CSI-RS REs of the neighbor cells are averaged such that it is possible to guarantee the average CSI-RS over a certain level in the neighbor cells.

The change of the muting pattern can be negotiated between the transmitter and receiver or notified from the transmitter to the receiver by means of a physical layer control signal or a higher layer signal.

In a case where a predetermined muting pattern is used and the muting pattern is determined according to the cell id, the CSI-RS pattern and muting pattern predefined based on the cell id of the cell to which the receiver performs handover from the current service cell is applied.

In a case where a predetermined muting pattern is used but it is necessary to change the muting pattern, the transmitter should notify the receiver of the change of the muting pattern by means of a physical layer control signal or a higher layer signal.

In a case where the muting pattern is not predetermined, the transmitter should notify the receiver of the information on the pattern by means of a physical layer control signal or a higher layer signal.

5) Combined Application of Muting Schemes

In the exemplary embodiments of the present invention, the muting schemes for determining a muting pattern according to the CSI-RS pattern or antenna port are proposed. Also, the muting schemes for determining a muting pattern based on the transmission time point and frequency band are proposed. These muting pattern determination and application methods can be combined as far as they are not conflicting with each other.

Figure 8:
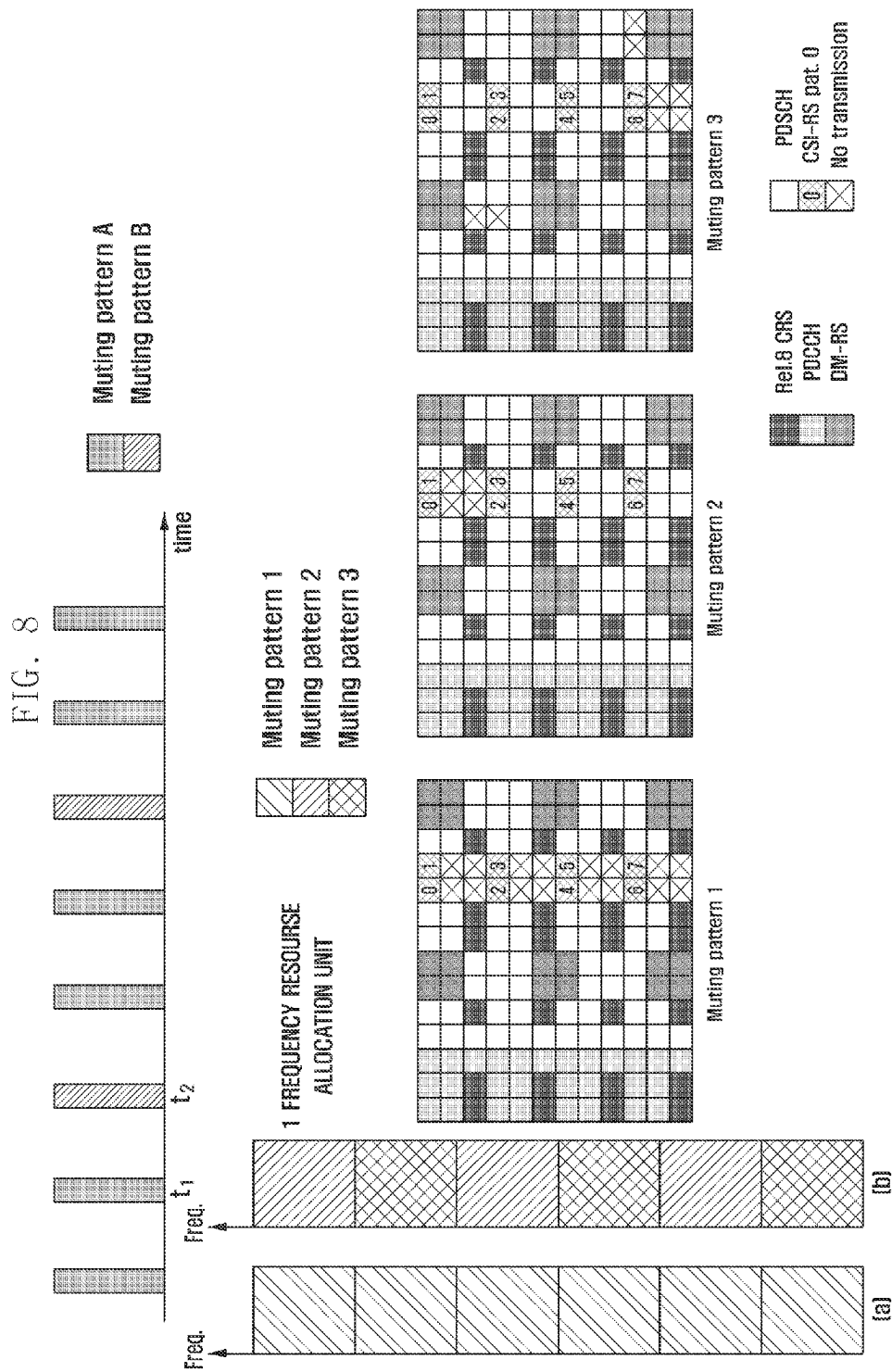
FIG. 8 is a diagram illustrating a characteristic of a partial muting method according to a seventh exemplary embodiment of the present invention.

FIG. 8 is a diagram illustrating a characteristic of a partial muting method according to a seventh exemplary embodiment of the present invention.

Referring to FIG. 8, the transmission cycle-based muting scheme is used in such a way that the reuse pattern-based muting scheme is applied at time t1 and the antenna port-based muting scheme in consideration of frequency band is applied at time t2. Similar to this exemplary case, other combinations of the muting schemes proposed above fall within the scope of the present invention.

6) Block Diagrams and Flowcharts Illustrating Muting Schemes

Figure 9:
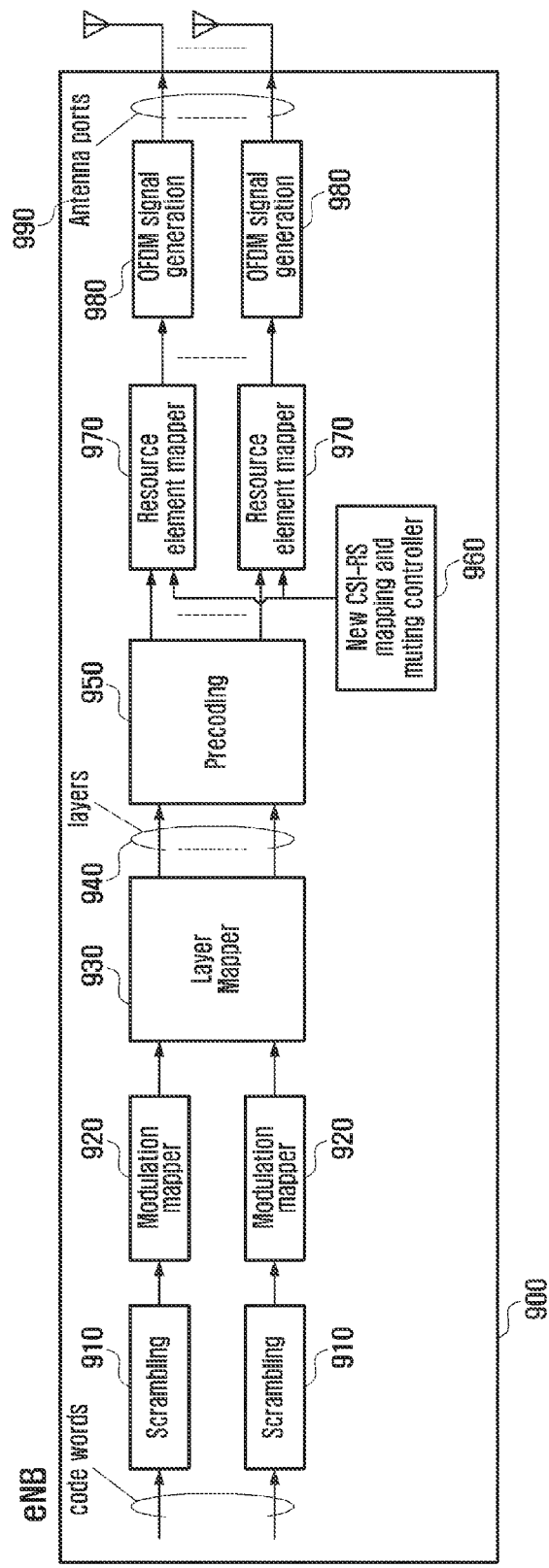
FIG. 9 is a block diagram illustrating a configuration of a transmitter supporting a muting scheme according to an exemplary embodiment of the present invention.

FIG. 9 is a block diagram illustrating a configuration of a transmitter supporting a muting scheme according to an exemplary embodiment of the present invention. The transmitter 900 may be an evolved Node B (eNB) 900.

Referring to FIG. 9, the transmit signal is encoded by the transmitter 900 into codewords to be transmitted through channel coding and rate matching according to the selected Modulation and Coding Scheme (MCS) level and transmission rank. The scrambling unit 910 performs scrambling on the codewords. The modulation mapper 920 performs modulation on the scrambled codewords at an MCS level. The layer mapper 930 maps the modulation symbols to the corresponding layers 940. The precoding unit 950 performs precoding on the modulation symbols mapped to the respective layer 940.

The resource element mapper 970 maps the precoded modulation symbols to the resource elements. At this time, the control unit 960 determines the positions carrying the CSI-RS and data and to be muted and controls the resource element mapper 970 to perform resource element mapping based on the result of the determination. The control unit 960 may also be referred to as a new CSI-RS mapping and muting controller 960.

The OFDM signal generation unit 980 converts the symbols mapped to the resource elements to OFDM signals. The antenna port 990 transmits the OFDM signals to a receiver.

Figure 10:
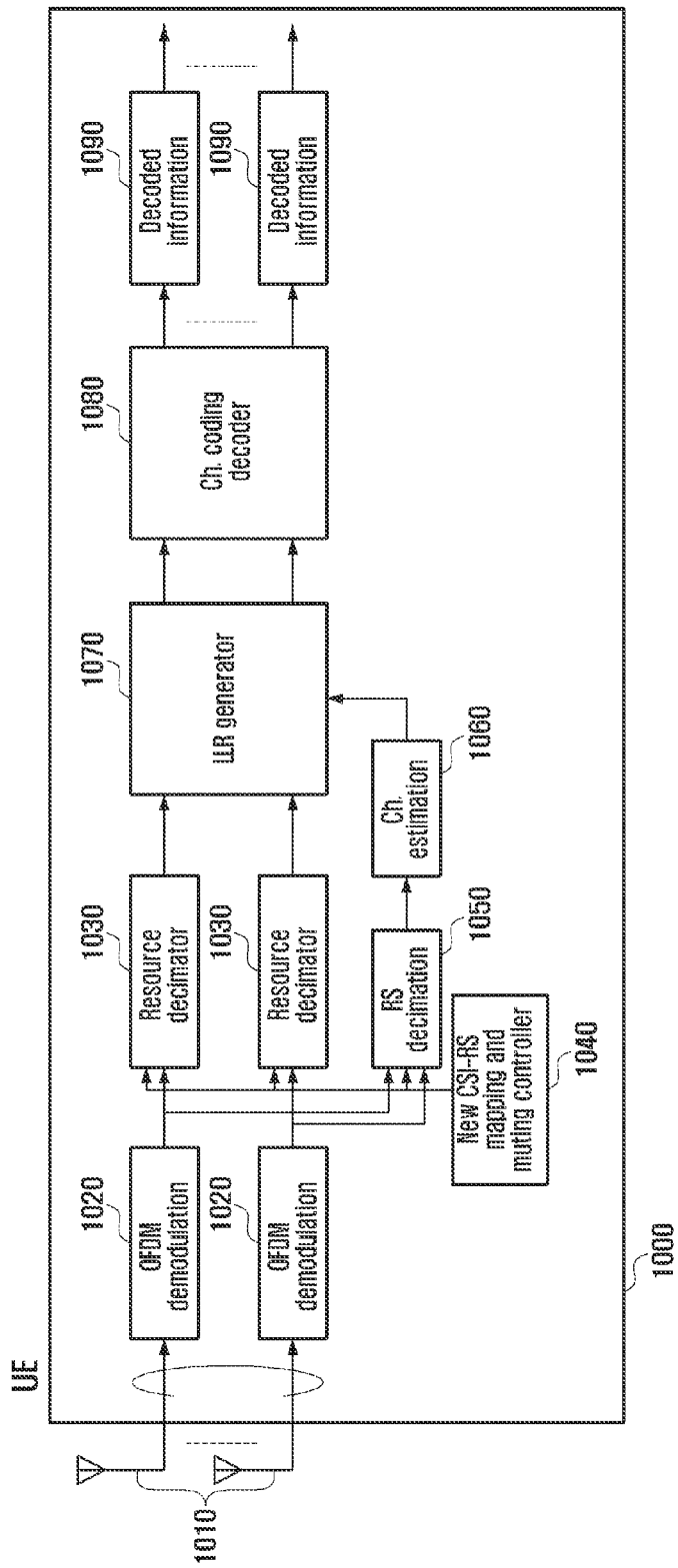
FIG. 10 is a block diagram illustrating a configuration of a receiver according to an exemplary embodiment of the present invention.

FIG. 10 is a block diagram illustrating a configuration of a receiver according to an exemplary embodiment of the present invention. The receiver 1000 may be a User Equipment (UE) 1000.

Referring to FIG. 10, the transmit signal is received through antenna port 1010 of the receiver 1000 via a radio channel. The OFDM demodulation unit 1020 performs OFDM demodulation on the received signal. The resource decimator 1030 and RS decimator 1050 discriminate among the CSI-RS and data, and transfers the CSI-RS and data to the channel estimator 1060 and LLR generator 1070 respectively. At this time, the controller 1040 locates the positions of CSI-RS, data and muted positions and informs the resource decimator 1030 and the RS decimator 1050 of the positions. The controller 1040 may also be referred to as a new CSI-RS mapping and muting controller 1040. The resource decimator 1030 and the RS decimator 1050 transfer the values acquired at the corresponding REs to the LLR generator 1070 and the channel estimator 1060. The channel estimator result is transferred to the LLR generator 1070. The LLR generator 1070 is a component that extracts a data symbol and thus it is an exemplary implementation of a data symbol extractor. The channel coding decoder 1080 decodes the data symbol. Finally, the UE can obtain the decoded information 1090.

Figure 11:
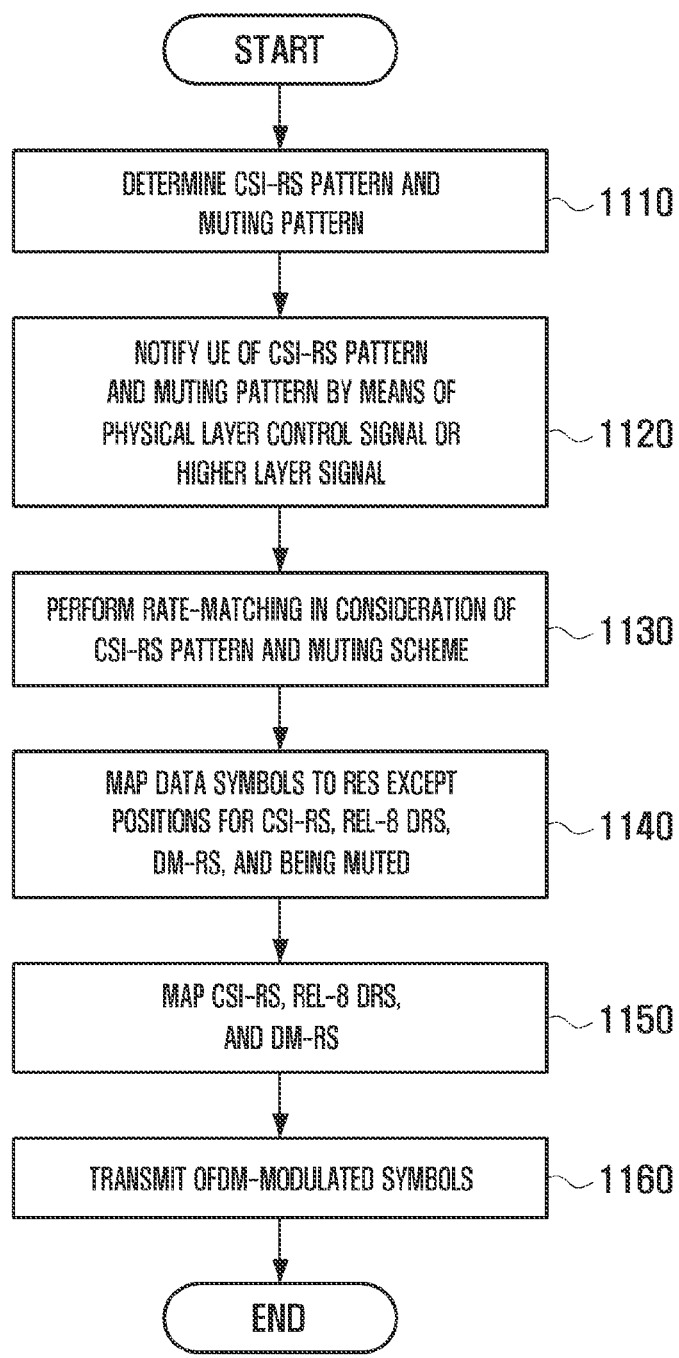
FIG. 11 is a flowchart illustrating a transmission procedure with a muting scheme according to an exemplary embodiment of the present invention.

FIG. 11 is a flowchart illustrating a transmission procedure with a muting scheme according to an exemplary embodiment of the present invention.

Referring to FIG. 11, the eNB 900 determines the CSI-RS pattern and muting pattern to be used in step 1110. As described above, the muting pattern can be predetermined according to cell id of the eNB 900. Also, there can be a CSI-RS pattern predetermined according to the cell id. In this case, it is not necessary for the eNB to inform the UE of the muting pattern. That is, the muting pattern is notified to the UE implicitly without additional signaling. If no signal is transmitted at an RE, the UE regards the RE as a muted RE. In a case where the eNB notifies the UE of only whether a muting pattern is used, the UE 1000 can determines the muting pattern based on the cell id or other information. The muting pattern also can be determined in consideration with other elements and, in this case, it is necessary to notify the UE 1000 of the muting pattern by signaling explicitly. In the exemplary embodiment of FIG. 11, the muting pattern is signaled to the UE 1000 explicitly.

The eNB 900 signals the CSI-RS pattern and muting pattern to be used to the UE 1000 by means of a higher layer signal or a physical layer control signal in step 1120. Such a signaling is preferably performed when the UE 1000 performs handover to enter the coverage of the eNB 900 or the eNB 900 changes the CSI-RS pattern or the muting pattern.

For example, the eNB 900 can signal the CSI-RS pattern or muting pattern by transmitting a higher layer signal or a physical layer controller containing a CSI-RS pattern indicator for indicating the CSI-RS pattern to be used and/or a muting pattern indicator for indicating the muting pattern to be used. Here, the CSI-RS pattern indicator can be a reuse pattern identifier. In the exemplary case of part (a) of FIG. 1, the CSI-RS patterns 0 to 5 can be assigned unique CSI-RS pattern indicator, respectively. It is assumed that the information on the mappings between the CSI-RS reuse pattern identifiers and CSI-RS patterns are shared between the eNB 900 and UE 1000.

Also, the muting pattern indicator can be a muting pattern identifier. For example, the identifier 0 can be assigned to the muting pattern of part (a) of FIG. 2, the identifier 1 to the muting pattern of part (b) of FIG. 2, the identifier 2 to the muting pattern of part (c) of FIG. 2. It is assumed that the information on the mappings between the muting pattern identifiers and the muting patterns are shared between the eNB 900 and UE 1000.

According to another exemplary embodiment, the muting pattern indicator can include at least one of the CSI-RS reuse pattern identifier referred to create a muting pattern and the antenna port identifier. In the exemplary case of part (a) of FIG. 1, the CSI-RS patterns 0 to 5 can be assigned the identifiers 0 to 5, and the antenna port numbers 0 to 7 can be used as the antenna port identifiers. For example, in a case where the muting pattern is generated by referencing the CSI-RS reuse pattern identifier, and if the eNB 900 determines to use the CSI-RS patterns 3 and 4 in part (a) of FIG. 1, the identifiers 3 and 4 are transmitted to the UE 1000 as contained in the muting pattern indicator. Also, in a case of using the antenna port-based muting scheme, if the eNB 900 determines to use the muting pattern for the antenna ports 4 and 5 as shown in part (a) of FIG. 1, the identifiers 4 and 5 are transmitted to the UE 1000 as contained in the muting pattern indicator. In a case where the muting pattern is generated by referencing both the CSI-RS reuse pattern identifier and antenna port, if the eNB 900 determines to use the CSI-RS patterns 3 and 4 and antenna ports 4 and 5 in part (a) of FIG. 1, the CSI-RS reuse pattern identifiers 3 and 4 and the antenna port identifiers 4 and 5 are transmitted to the UE 1000 as combined in the muting pattern indicator. The muting pattern indicator can be configured as shown in Table 1.

TABLE 1

| | Field | |
| --- | --- | --- |
| | CSI-RS pattern identifier field | Antenna port identifier field |
| Data | 3, 4 | 4, 5 |

Also, the muting pattern indicator can include the information on the mapping between the frequency band or the combination of time and frequency band and the muting pattern.

For example, if the transmission time is t, it is assumed that the muting pattern 0 is selected for the case where the remainder obtained by dividing the t by 4 is 0 or 1, the muting pattern 1 is selected for the case where the remainder is 2, and the muting pattern 2 is selected for the case where the remainder is 3. In this case, the information on the mapping of the muting pattern to the time point is transmitted to the UE 1000 as contained in the muting pattern indicator. Table 2 shows exemplary mappings between the muting patterns and time points.

TABLE 2

|  | T mod 4 | | | |
| --- | --- | --- | --- | --- |
|  | 0 | 1 | 2 | 3 |
| Muting pattern identifier | 0 | 0 | 1 | 2 |

In a case where the muting pattern is determined according to the frequency band, the information on the mappings between the muting patterns and frequency bands is transmitted to the UE 1000 as contained in the muting pattern indicator. Table 3 shows exemplary mappings between the muting patterns and frequency band.

TABLE 3

|  | Frequency band identifier | | | |
| --- | --- | --- | --- | --- |
|  | 0 | 1 | 2 | 3 |
| Muting pattern identifier | 0 | 1 | 1 | 2 |

The frequency band identified by the identifier 0 is assigned the muting pattern 0.

The frequency band identified by the identifier 1 is assigned the muting pattern 1.

The frequency band identified by the identifier 2 is assigned the muting pattern 2.

In a case where the muting pattern is determined according to the combination of the transmission time point and frequency band, the information on the mappings between the muting patterns and the combinations of the transmission time points and frequency bands are transmitted to the UE 1000 as contained in the muting pattern indicator. Table 4 shows exemplary mappings between the muting patterns and the combinations of the transmission time points and frequency bands.

TABLE 4

|  | Frequency Band 0 | Frequency band 1 | Frequency band 2 | Frequency Band 3 |
| --- | --- | --- | --- | --- |
| T mod 4 = 0 | Muting pattern 0 | Muting pattern 1 | Muting pattern 1 | Muting pattern 2 |
| T mod 4 = 1 | Muting pattern 0 | Muting pattern 0 | Muting pattern 0 | Muting pattern 0 |
| T mod 4 = 2 | Muting pattern 0 | Muting pattern 3 | Muting pattern 0 | Muting pattern 0 |
| T mod 4 = 3 | Muting pattern 0 | Muting pattern 4 | Muting pattern 0 | Muting pattern 0 |

The frequency band 0 is assigned the muting pattern 0 regardless of transmission time point. The frequency band 1 is assigned a series of muting patterns 1, 0, 3 and 4 as cyclically time progresses.

Although the mapping information itself can be transmitted in the muting pattern indicator as shown in tables 2 to 4, it is also possible to transmit the identifiers of the mapping information as contained in the muting pattern indicator.

A description is made of another exemplary embodiment of a muting scheme signaling from the transmitter (eNB) 900 to the receiver (UE) 1000.

In the signaling method described hereinafter, the signal can be transmitted by means of a physical layer control signal or a higher layer signal or in other methods. The system supporting the muting systems can include some or entire features of the signaling method that are described hereinafter.

(a) The transmitter (eNB) transmits a 1-bit muting on/off signal to the receiver (UE).

(b) The UE can be aware of the muting pattern according to the cell id of the serving cell or frame number, OFDM symbol position (index) at which the CSI-RS is transmitted in the subframe, CSI-RS transmission cycle, muting cycle, number of cells that belong to a Coordinated MultiPoint (CoMP) set, entire system bandwidth, and size of a sub-band.

(c) The transmitter (eNB) transmits an N-bit signal informing of the muting to the receiver (UE). The N-bit signal can be interpreted into 2N states for indicating one of the muting patterns predetermined according to the cell id of the serving cell or frame number, OFDM symbol position (index) at which the CSI-RS is transmitted in the subframe, CSI-RS transmission cycle, muting cycle, number of cells that belong to the CoMP set, entire system bandwidth, and size of a sub-band; and the number of interpreted states can be larger than 2N. Here, the 2N states can include a state for indicating no muting.

(d) In a case of reuse pattern-based muting scheme, it is possible to inform of the reuse pattern to be muted using the same method described at item (c) or only the position of the antenna port 0 of the reuse pattern to be muted. In a case of information of the antenna port 0, the UE can be aware of the positions of REs to be muted that correspond to the rest of the antenna ports based on the position of the antenna port 0 without additional signaling. The positions of the rest of the REs to be muted can be determined differently according to the cell id of the serving cell or frame number, OFDM symbol position (index) at which the CSI-RS is transmitted in the subframe, CSI-RS transmission cycle, muting cycle, number of cells that belong to the CoMP set, entire system bandwidth, and size of a sub-band.

(e) In a case of antenna port-based muting scheme, the N-bit signal can be used to notify of the 2N antenna ports to be muted. At this time, the port number of the antenna port to be muted can be determined differently according to the cell id of the serving cell or frame number, OFDM symbol position (index) at which the CSI-RS is transmitted in the subframe, CSI-RS transmission cycle, muting cycle, number of cells that belong to the CoMP set, entire system bandwidth, and size of a sub-band.

(f) The transmitter (eNB) can determine the muting cycle and notify the receiver (UE) of the muting cycle. In a case where the muting cycle is not informed, the UE can use the muting cycle negotiated in advance between the transmitter and the receiver or apply muting always in the subframes carrying CSI-RS. Although the CSI-RS transmission cycle and the muting cycle are identical with each other, the CSI-RS transmission and muting may not occur in the same subframe. The signal for notifying of the muting cycle can be interpreted differently according to the cell id of the serving cell or frame number, OFDM symbol position (index) at which the CSI-RS is transmitted in the subframe, CSI-RS transmission cycle, muting cycle, number of cells that belong to the CoMP set, entire system bandwidth, and size of a sub-band.

(g) In the frequency resource-based muting, different patterns can be applied for individual UEs. In view of the frequency axis, different muting patterns can be applied in a unit of one or more Resource Blocks (RBs) or Resource Block Groups (RBGs), or a sub-band for feedback, or other frequency axis resource unit. The muting patterns also include the non-muting pattern. The frequency axis resource unit can be determined differently according to the cell id of the serving cell or frame number, OFDM symbol position (index) at which the CSI-RS is transmitted in the subframe, CSI-RS transmission cycle, muting cycle, number of cells that belong to the CoMP set, entire system bandwidth, and size of a sub-band.

The eNB 900 calculates a number of data symbols to be transmitted and performs rate matching of data to be transmitted based on the number of data symbols in consideration of the CSI-RS pattern and muting pattern to be used in step 1130. Next, the eNB 900 maps the data symbols to empty REs in consideration of CSI-RS, DeModulation Reference Signal (DM-RS), Rel-8 DRS, and muting positions in step 1140. Next, the eNB 900 maps the CSI-RS, DM-RS, and Rel-8 DRS to corresponding positions in step 1150. Finally, the eNB 900 transmits the downlink signal of the data symbols and RSs after performing OFDM modulation thereon in step 1160.

Figure 12:
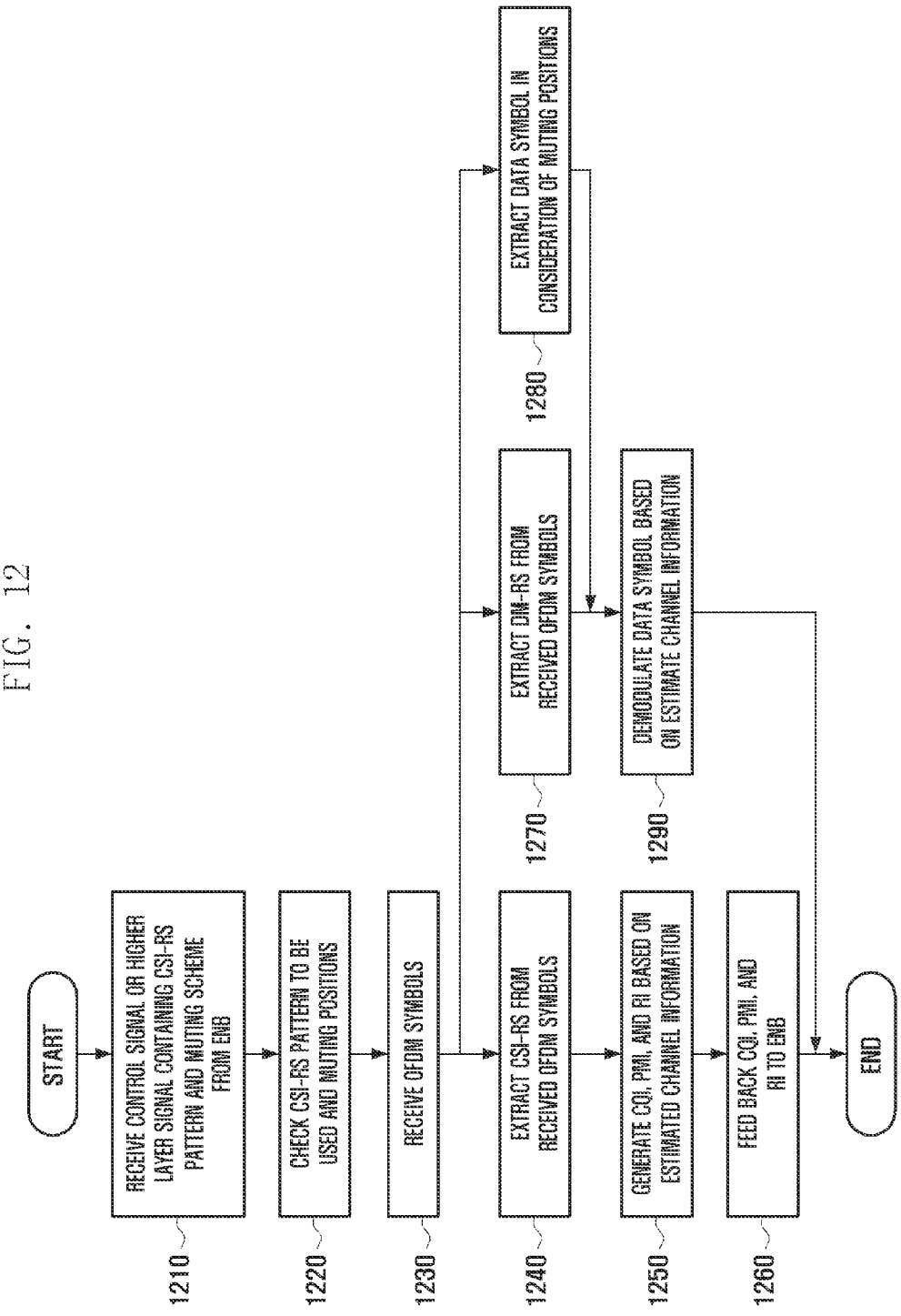
FIG. 12 is a flowchart illustrating a reception procedure with a muting scheme according to an exemplary embodiment of the present invention.

FIG. 12 is a flowchart illustrating a reception procedure with a muting scheme according to an exemplary embodiment of the present invention.

The embodiment of FIG. 12 shows a procedure in which the receiver 1000 receives a muting pattern signaling. If no muting pattern is signaled, the UE 1000 executes the procedure in a similar manner regardless of a muting pattern.

Referring to FIG. 12, the UE 1000 receives a physical layer control signal or higher layer signal transmitted by the transmitter (eNB) 900 in step 1210. The UE 1000 checks the CSI-RS, DM-RS, and muting positions based on the received physical channel control signal or higher layer signal in step 1220. At this time, the positions of the CSI-RS and muting can be determined by interpreting the received control signal and higher layer signal according to a predetermined method. The UE 1000 receives the OFDM symbols (subframe) in step 1230. Afterward, steps 1240, 1270, and 1280 can be executed individually in parallel. Steps 1240, 1270 and 1280 can be executed simultaneously or in a certain order.

The UE 1000 extracts the CSI-RS from the received OFDM symbols (subframe) in step 1240 and checks the positions of the CSI-RS, DM-RS, and data symbols and executes channel estimation based on the CSI-RS extracted. The UE 1000 generates feedback information of CQI, PMI, and RI based on the channel estimation in step 1250 and feeds back the CQI, PMI, and RI to the eNB in step 1260.

As an additional process, the UE 1000 extracts DM-RSs from the received OFDM symbols in step 1270. The UE 1000 executes channel estimation based on the extracted DM-RS. The UE 1000 receives data symbols at the REs in a Physical Downlink Shared Channel (PDSCH) region except for the positions of REs to which the CSI-RS, DM-RS, and Rel-8 DRS, and muted in step 1280. The UE 1000 performs data symbol demodulation with the channel estimation value acquired based on the DM-RSs in step 1290.

As described above, the method and apparatus for transmitting CSI-RS and data according to exemplary embodiments of the present invention is capable of improving channel estimation performance, thereby addressing the system throughput degradation problem of the muting method of the related art and may improve entire system capacity.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a channel state information reference signal (CSI-RS) by a base station, the method comprising:
   selecting a CSI-RS pattern including a first set of resource elements (REs);
   selecting a muting pattern including a second set of REs;
   transmitting an indicator indicating the muting pattern among a plurality of predefined muting patterns and period information applied to the muting pattern via higher layer signaling;
   mapping data symbols and the CSI-RS to REs based on the CSI-RS pattern and the muting pattern; and
   transmitting the data symbols and the CSI-RS to a user equipment (UE),
   wherein the data symbols are mapped to REs that are not included in the CSI-RS pattern and the muting pattern,
   wherein the muting pattern is selected among the plurality of predefined muting patterns and the plurality of predefined muting patterns are included in a set of CSI-RS pattern candidates, and
   wherein the indicator comprises a plurality of bits corresponding to the plurality of predefined muting patterns.

2. The method of claim 1, wherein the first set of REs and the second set of REs are composed of a pair of REs.

3. The method of claim 1, wherein the CSI-RS pattern and the muting pattern are included in the set of CSI-RS pattern candidates.

4. A method for receiving a channel state information reference signal (CSI-RS) by a user equipment (UE), the method comprising:
   receiving an indicator indicating a muting pattern among a plurality of predefined muting patterns and period information applied to the muting pattern via higher layer signaling;
   receiving data symbols and the CSI-RS mapped to resource elements (REs) from a base station;
   extracting the data symbols based on a CSI-RS pattern including a first set of REs and the muting pattern including a second set of REs;
   wherein the data symbols are mapped to REs that are not included in the CSI-RS pattern and the muting pattern,
   wherein the muting pattern is selected among the plurality of predefined muting patterns and the plurality of predefined muting patterns are included in a set of CSI-RS pattern candidates, and
   wherein the indicator comprises a plurality of bits corresponding to the plurality of predefined muting patterns.

5. The method of claim 4, wherein the first set of REs and the second set of REs are composed of a pair of REs.

6. The method of claim 5, wherein the CSI-RS pattern and the muting pattern are included in the set of CSI-RS pattern candidates.

7. A base station for transmitting a channel state information reference signal (CSI-RS), the base station comprising:
   a transceiver transmitting and receiving signals to and from a user equipment (UE); and
   a controller controls to select a CSI-RS pattern including a first set of resource elements (REs), select a muting pattern including a second set of REs, to transmit an indicator indicating the muting pattern among a plurality of predefined muting patterns and period information applied to the muting pattern via higher layer signaling, map data symbols and the CSI-RS to REs based on the CSI-RS pattern and the muting pattern, and transmit the data symbols and the CSI-RS to a user equipment (UE), and
   wherein the data symbols are mapped to REs that are not included in the CSI-RS pattern and the muting pattern,
   wherein the muting pattern is selected among the plurality of predefined muting patterns and the plurality of predefined muting patterns are included in a set of CSI-RS pattern candidates, and
   wherein the indicator comprises a plurality of bits corresponding to the plurality of predefined muting patterns.

8. The base station of claim 7, wherein the first set of REs and the second set of REs are composed of a pair of REs.

9. The base station of claim 7, wherein the CSI-RS pattern and the muting pattern are included in the set of CSI-RS pattern candidates.

10. A user equipment apparatus for receiving a channel state information reference signal (CSI-RS), the apparatus comprising:
    a transceiver transmitting and receiving signals to and from a base station; and
    a controller controls to receive an indicator indicating a muting pattern among a plurality of predefined muting patterns and period information applied to the muting pattern via higher layer signaling, to receive data symbols and the CSI-RS mapped to resource elements (REs) from a base station, and extract the data symbols based on a CSI-RS pattern including a first set of REs and the muting pattern including a second set of REs, and
    wherein the data symbols are mapped to REs that are not included in the CSI-RS pattern and the muting pattern,
    wherein the muting pattern is selected among the plurality of predefined muting patterns and the plurality of predefined muting patterns are included in a set of CSI-RS pattern candidates, and
    wherein the indicator comprises a plurality of bits corresponding to the plurality of predefined muting patterns.

11. The apparatus of claim 10, wherein the first set of REs and the second set of REs are composed of a pair of REs.

12. The apparatus of claim 10, wherein the CSI-RS pattern and the muting pattern are included in the set of CSI-RS pattern candidates.

* * * * *